(12) United States Patent
Cheng

(10) Patent No.: US 11,786,935 B2
(45) Date of Patent: Oct. 17, 2023

(54) WAVE-SHAPED POLYURETHANE HIGH-FREQUENCY LINEAR VIBRATING SCREEN MESH

(71) Applicant: ANHUI FANGYUAN YIZHI SCREENING TECHNOLOGY CO., LTD, Huaibei (CN)

(72) Inventor: Yao Cheng, Huaibei (CN)

(73) Assignee: ANHUI FANGYUAN YIZHI SCREENING TECHNOLOGY CO., LTD, Huaibei (CN)

( * ) Notice: Subject to any disclaimer, the term of this patent is extended or adjusted under 35 U.S.C. 154(b) by 49 days.

(21) Appl. No.: 17/600,236

(22) PCT Filed: Jun. 17, 2021

(86) PCT No.: PCT/CN2021/100611
§ 371 (c)(1),
(2) Date: Sep. 30, 2021

(87) PCT Pub. No.: WO2022/105219
PCT Pub. Date: May 27, 2022

(65) Prior Publication Data
US 2022/0347722 A1    Nov. 3, 2022

(30) Foreign Application Priority Data
Nov. 17, 2020  (CN) .......................... 202011288386.2

(51) Int. Cl.
*B07B 1/46* (2006.01)
*B07B 1/28* (2006.01)

(52) U.S. Cl.
CPC .............. *B07B 1/28* (2013.01); *B07B 1/4654* (2013.01)

(58) Field of Classification Search
CPC ............ B07B 1/28; B07B 1/46; B07B 1/4645
USPC .................................................. 209/301, 346
See application file for complete search history.

(56) References Cited

FOREIGN PATENT DOCUMENTS

| CN | 203725378 U | * | 7/2014 | |
| CN | 108906600 A | * | 11/2018 | ............... B07B 1/28 |
| CN | 210730137 U | * | 6/2020 | |
| CN | 112246625 A | * | 1/2021 | ............... B07B 1/28 |
| CN | 213727798 U | * | 7/2021 | ............... B07B 1/28 |

(Continued)

*Primary Examiner* — Terrell H Matthews
(74) *Attorney, Agent, or Firm* — Gearhart Law, LLC; David Postolski

(57) ABSTRACT

The present disclosure discloses a wave-shaped polyurethane high-frequency linear vibrating screen mesh, which solves the problems of unobvious layering and poor screening effect of the existing screen mesh. The wave-shaped polyurethane high-frequency linear vibrating screen mesh comprises a side blind area and a screening area. The screen area is composed of wave-shaped injection molding polyurethane screen pieces. Materials roll forward along the direction of material flow in a wavy manner. Clamping grooves are formed in the blind area, which can be in buckle fit on rail seats of a small beam of a screening machine. The screen gap direction of the screening area is consistent with the direction of the material flow. Through the arrangement of a wave-shaped screen mesh surface, the wave-shaped polyurethane high-frequency linear vibrating screen mesh effectively optimizes the running state of the materials, and promotes effective layering of coarse and fine materials.

1 Claim, 5 Drawing Sheets

(56) References Cited

FOREIGN PATENT DOCUMENTS

| | | | | |
|---|---|---|---|---|
| DE | 10116424 A1 | * | 10/2002 | ........... B07B 1/4645 |
| DE | 102006008444 A1 | * | 10/2006 | ............... B04B 7/16 |
| WO | WO-2005070564 A1 | * | 8/2005 | ........... B01D 29/012 |

* cited by examiner

WAVE-SHAPED POLYURETHANE HIGH-FREQUENCY LINEAR VIBRATING SCREEN MESH

TECHNICAL FIELD

The present disclosure relates to screening equipment, and in particular, to a wave-shaped polyurethane high-frequency linear vibrating screen mesh.

BACKGROUND

High-frequency vibrating screen is a screening machine which is widely used in the industries of coal and the like for the classification, dehydration, desliming and medium removal of fine-grained materials. In a working process, the high-frequency vibrating screen utilizes the excitation of a vibrating motor as a vibrating source, so that materials are thrown up, loosened and layered on a screen mesh. Small granular materials penetrate through the screen, while large granules continue to be thrown up and simultaneously move forward in a straight line. The materials uniformly enter a feeding port of the screening machine from a feeding machine.

Several specifications of over-sized materials and under-sized materials are produced and are respectively discharged from their respective outlets.

The core of the screening machine is the screen mesh. The screen meshes used in the past are mainly metal screen meshes. In recent years, rubber and polyurethane screen meshes are gradually recognized by everyone and are popularized and applied due to their advantages of light weight, good elasticity, high wear resistance, good self-cleaning effect, long service life, maintenance free, and the like. The rubber and polyurethane screen meshes are also the development direction of the screen meshes. Most screen meshes used currently are plane screen meshes. In a using process, the layering of the materials on a screen surface is not obvious when the materials are screened due to the influence of the factors, such as the properties and viscosity of the materials on the screen surface and unreasonable selection of vibration frequency and vibration amplitude. In the forward linear movement of the materials, the coarse and fine materials are wrapped and entrained with each other and run along the direction of material flow, which affects the screening effect and fails to achieve an ideal screening purpose.

SUMMARY

The objective of the present disclosure is to overcome the disadvantages in the prior art and provide a wave-shaped polyurethane high-frequency linear vibrating screen mesh, which solves the problems of unobvious layering and poor screening effect of coarse and fine materials of the existing plane screen mesh, effectively retains fine materials, prolongs the effective screening time of the fine materials on the screen surface, and improves the screening efficiency of the materials by using the difference of climbing capacity of coarse and fine granules during a vibrating process.

The wave-shaped polyurethane high-frequency linear vibrating screen mesh of the present disclosure is a quadrilateral and includes a side blind area and a screen area. The screen area is composed of a plurality of injection molding polyurethane screen pieces. The screen pieces are arranged in a wavy form in the running direction of materials. The wavelength of the screen area is 100 to 150 mm and the vibration amplitude is 10 to 50 mm. Clamping grooves are formed in one pair of opposite sides and are in buckle fit on mounting rail seats of a small beam of a screening machine; the other opposite sides are planes.

The screen piece includes a frame and an open area. The open area is formed by interweaving longitudinal screen strips and transverse screen strips. The side parts of the longitudinal screen strips and the transverse screen strips and the frame are connected into a whole. The longitudinal screen strips are protruded on the screen area, and the middle parts are wave-shaped protrusions and are wave-shaped in the direction of material flow. The cross sections of the longitudinal screen strips are large in upper parts and small in lower parts, and the lower parts are trapezoids or arcs. A conical screen gap consistent with the direction of the material flow is formed between two adjacent longitudinal screen strips. The transverse screen strips are slightly lower than the longitudinal screen strips, and sink in the lower part of the perforated area below the screen area. The spacing is about 12 mm. The longitudinal screen strips are connected together from the lower parts to divide the screen gap into a plurality of rectangular screen holes.

It can be seen from the above technical solution that the present disclosure has the following beneficial effects that: 1, a polyurethane material is adopted, so the weight is light, the self-cleaning effect is good, and the service life is long; 2, compared with a plane screen mesh, the screening area and the open rate are greatly improved; 3, the arrangement of the wave-shaped screen surface more optimizes the running trajectory of the materials on the screen surface, makes the materials roll forward on the screen surface, and promotes the layering of the materials by using the difference of the climbing capacity of the granular materials with different particle sizes; large granules quickly cross over a crest to continue running, and small granules and moisture retain in a trough to complete penetrating screening; 4, the wave-shaped screen mesh surface is beneficial to transverse displacement in a material running process, is beneficial to uniform arrangement of the materials on the overall screen surface, and is beneficial to improving the screening effect of the materials; 5, practice proves that the screening machine adopting the structure can improve the penetrating screening rate by 8 to 15%, greatly reduces the workload of secondary crushing, and reduces power loss and reactive power loss of equipment.

Figure 1:
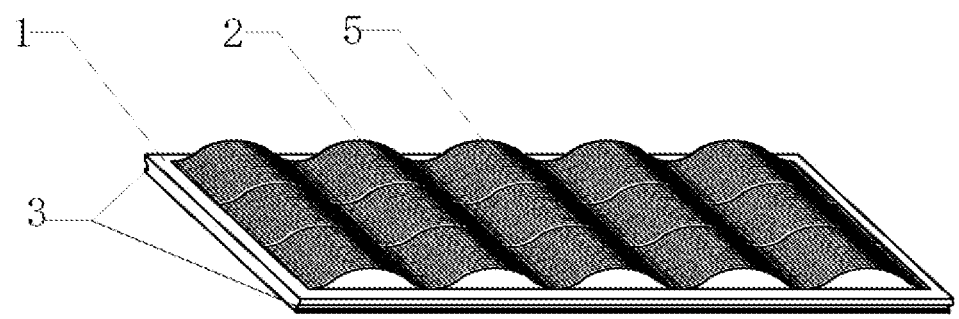
FIG. 1 is a three-dimensional schematic diagram of a screen mesh of the present disclosure.

In the drawings: 1—side blind area; 2—screening area; 3—polyurethane coating; 4—flat steel framework;

5—screen piece; 6—frame; 7—transverse screen strip; 8—longitudinal screen strip; 9—screen gap; 10—perforated area; 11—clamping groove; 12—mounting rail seat.

DETAILED DESCRIPTION

The technical solutions in the embodiments of the present disclosure will be clearly and completely described herein below with reference to the accompanying drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

As shown in FIG. 1, the wave-shaped polyurethane high-frequency linear vibrating screen mesh described in the present disclosure is a quadrilateral, and includes a side blind area 1 and a screening area 2. The screening area 2 is composed of a plurality of injection molding pieces 5 up and down and left and right. The screen pieces 5 are arranged in a wavy form in the running direction of materials. The wavelength of the screening area 2 is 100 to 150 mm and the vibration amplitude is 10 to 50 mm.

Figure 7:
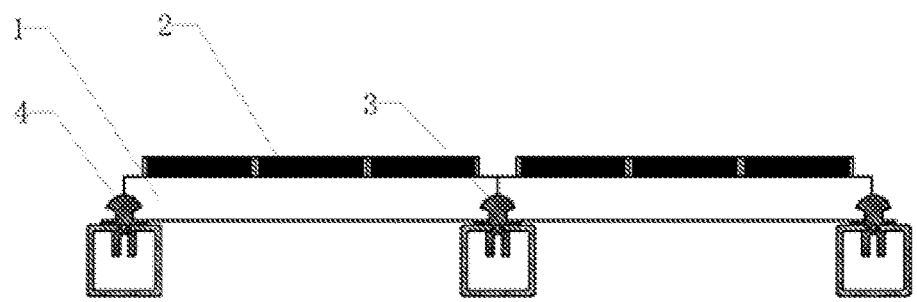
FIG. 7 is a schematic diagram of mounting of the screen mesh of the present disclosure.
Figure 8:
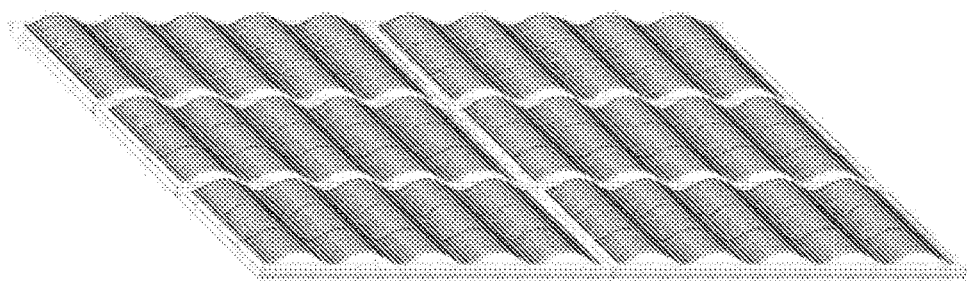
FIG. 8 is a schematic diagram of a wave-shaped screen surface formed by mounting the screen mesh of the present disclosure.

The side blind area 1 includes a polyurethane coating and a flat steel framework. Clamping grooves 3 are formed in one pair of opposite sides, as shown in FIG. 7, which are in buckle fit on mounting rail seats 4 of a small beam of a screening machine; the other pair of opposite sides are planes, as shown in FIG. 8, which facilitates close arrangement of a plurality of wave-shaped polyurethane high-frequency linear vibrating screen meshes.

Figure 2:
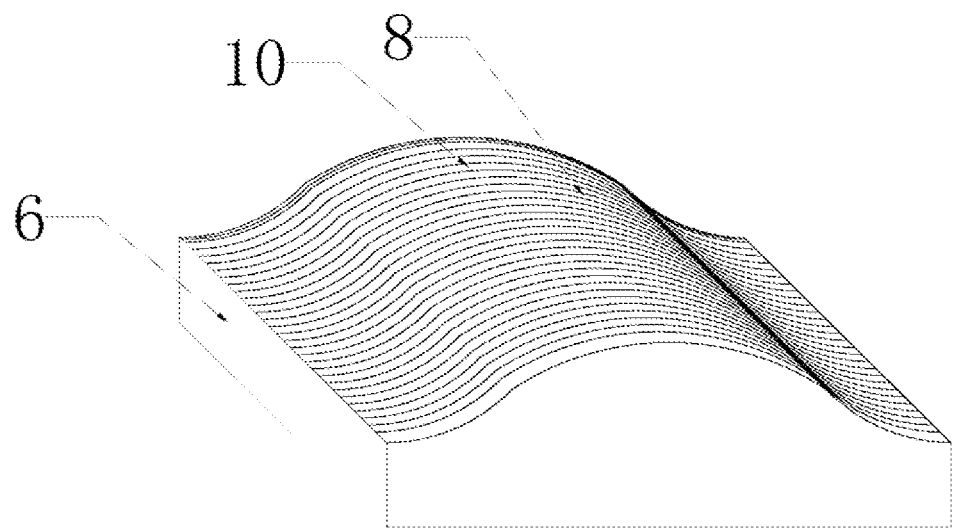
FIG. 2 is a three-dimensional schematic diagram of a part, namely, a screen piece, of the screen mesh of the present disclosure.
Figure 3:
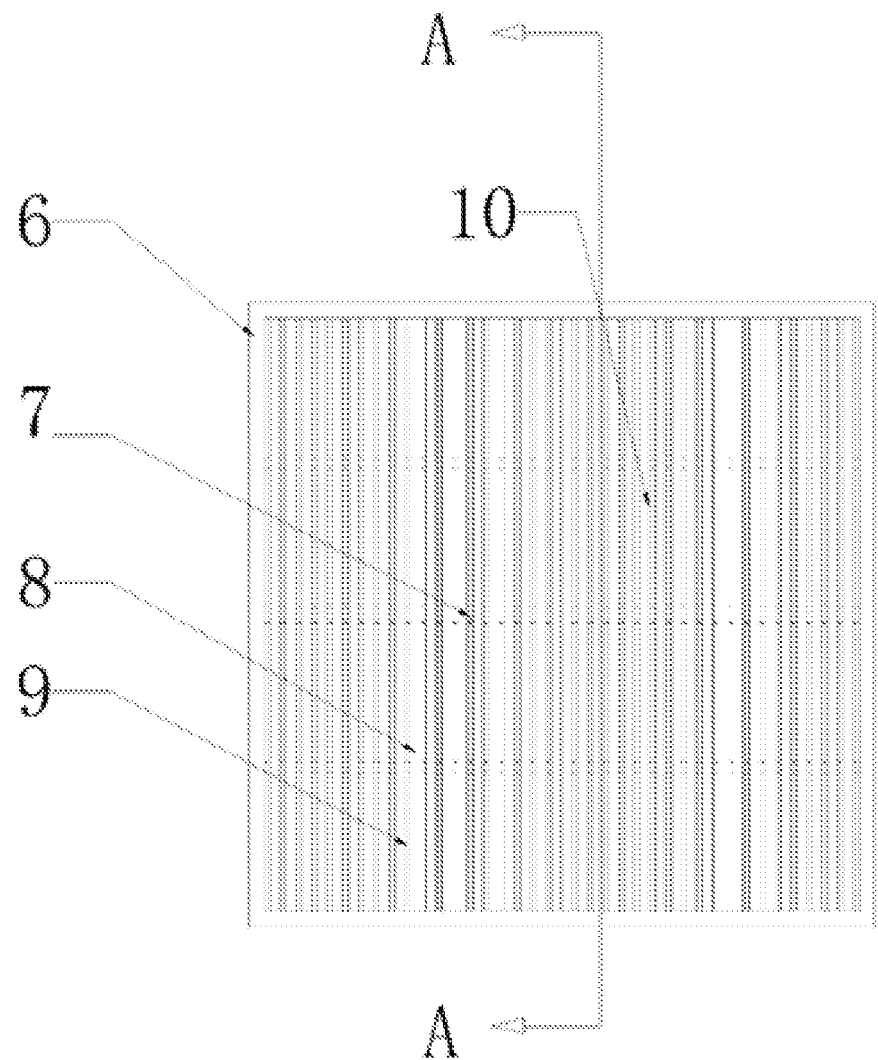
FIG. 3 is a vertical view of the screen mesh of the present disclosure.
Figure 4:
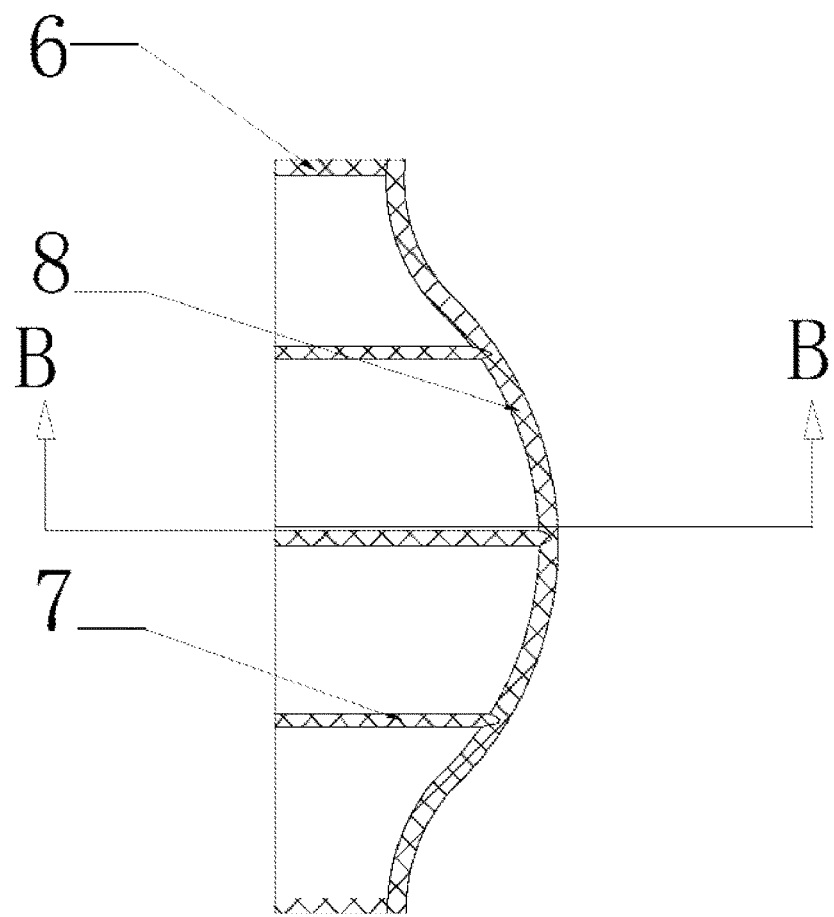
FIG. 4 is a sectional view of A-A in FIG. 3.
Figure 5:
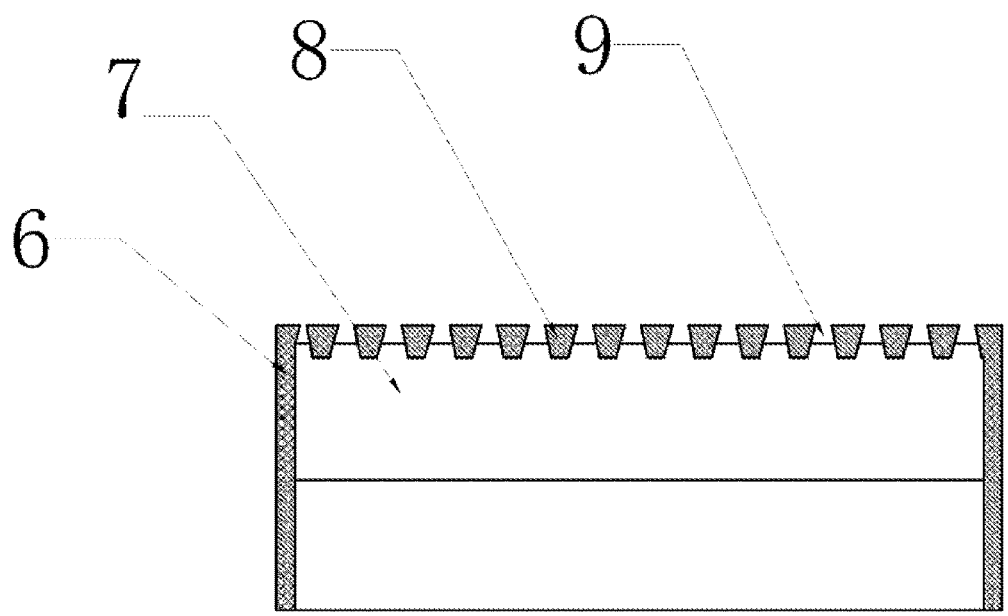
FIG. 5 is a sectional view of B-B in FIG. 4.

As shown in FIG. 2, the screen piece 5 includes a frame 6 and an open area 10. In combination with FIGS. 3 and 4, the open area 10 is formed by interweaving longitudinal screen strips 8 and transverse screen strips 7. The side parts of the longitudinal screen strips 8 and the transverse screen strips 7 and the frame 6 are connected into a whole. The longitudinal screen strips 8 are protruded on the screen area 2, and the middle parts are wave-shaped protrusions and are wave-shaped in the direction of material flow. In combination with FIG. 5, the cross sections of the longitudinal screen strips 8 are large in upper parts and small in lower parts, and the lower parts are trapezoids or arcs. A conical screen gap 9 is formed between two adjacent longitudinal screen strips 8, which facilitates screening and penetrating. The transverse screen strips 7 are slightly lower than the longitudinal screen strips 8, and sink in the lower part of the open area 10 below the screen area 2. The spacing is about 12 mm. The longitudinal screen strips 8 are connected together from the lower parts to divide the screen gap 9 into a plurality of rectangular screen holes, which is beneficial to the shaping the screen holes, improving the strength of the screen holes, and achieving a strengthening effect of the whole screen pieces 5.

The direction of the screen gap 9 is consistent with the direction of the material flow. The width is set as 0.15 mm, 0.25 mm, 0.5 mm, 0.75 mm, 1.0 mm, 1.5 mm, and 2.0 mm according to screening requirements. The back width of the longitudinal screen strips 8 are correspondingly and respectively set as 1.25 mm, 1.25 mm, 1.5 mm, 1.5 mm, 1.75 mm, 1.75 mm, and 2.0 mm.

The open area 10 can effectively retain and delay the running of fine granules, improve the screening and penetrating probability, and improve the screening capacity by using the difference of climbing capacity of different particle sizes on the screen surface.

The screen pieces 5 are made of a TPU material by an injection molding machine through mold injection.

Figure 6:
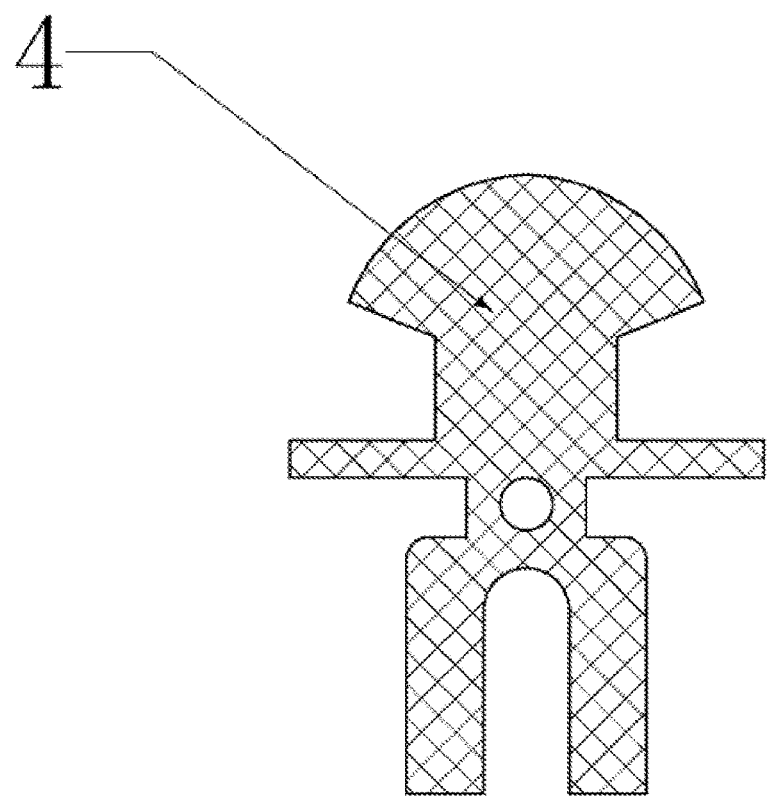
FIG. 6 is a cross-sectional view of a mounting rail seat.

FIG. 6 is a cross-sectional view of a mounting rail seat 4. The mounting rail seat 4 can be mounted on a small beam of a screening machine. The present disclosure can be quickly and conveniently buckled and mounted in place by using the mounting clamping grooves 3 in the two opposite sides, and do not need to be mounted by using bolts, which saves time and is convenient to detach and replace.

As shown in FIG. 7, the mounting rail seat 4 is mounted on the small beam of the screening machine. The screen mesh is in buckle fit or press fit on the mounting rail seat 4 by using the clamping grooves 3 in the two sides, which is convenient and quick.

As shown in FIG. 8, a plurality of wave-shaped polyurethane high-frequency linear vibrating screen meshes are mounted on the screening machine to form a wave-shaped screen surface.

Figure 9:
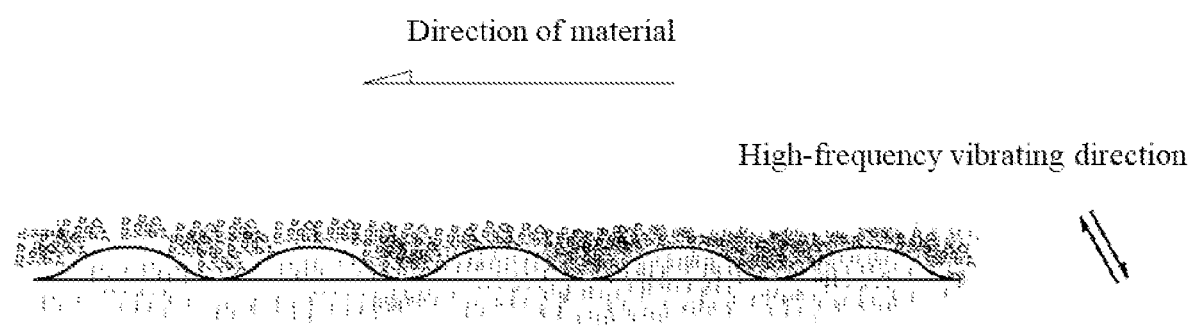
FIG. 9 is a schematic diagram of a material screening state during working of the present disclosure.

Working principle: as shown in FIG. 9, a plurality of continuous undulating waves are arranged on the screen surface in the direction of material flow. The materials enter the screen surface from a feeding end and run to a discharging end along the screen surface due to the action of high-frequency vibration. Because the screen surface is in a high-frequency vibration state all the time, the materials are thrown up and fall down, and are rebounded and fall down again continuously. The materials roll forward in the process of falling onto the screen surface due to the action of the wave-shaped screen surface. In the process of going forward, due to the difference of weight, the large granular materials have great capacity and probability of crossing over the crest of the screen surface because of great resilience force of the screen surface. On the contrary, the throwing height of the small materials is relatively small because of small resilience force. Therefore, the probability of large granules passing through the crest is much greater than that of fine materials, so that a layering phenomenon which facilitates screening is formed on the screen surface. Fine granules and the moisture are easily screened at the open area at the bottom layer.

Therefore, the present disclosure can effectively promote the layering of coarse materials and fine materials through a wave-shaped structural arrangement, which optimizes the screening state of the materials. Large material granules can pass through the wave-shaped screen area quickly, while the probability that small granules are distributed at the lower layer to complete screening in a trough is greatly improved.

By using the difference of the climbing capacity of the coarse and fine granules, the wave-shaped screen mesh solves the problem of unobvious layering and poor screening effect of the coarse and fine materials of the existing plane screen mesh, effectively retains the fine materials and moisture, prolongs the effective screening time of the fine materials and the moisture on the screen surface, improves the screening efficiency of the materials, and solves the problems of material wrappage and entrainment, unobvious layering, and poor screening effect caused by various factors in the prior art.

What is claimed is:

1. A wave-shaped polyurethane high-frequency linear vibrating screen mesh, being a quadrilateral, and comprising a side blind area and a screening area, wherein the screening area is composed of a plurality of injection molding polyurethane screen pieces; the plurality of injection molding polyurethane screen pieces are arranged in a wavy form in a running direction of materials; each of the plurality of injection molding polyurethane screen pieces comprises a frame and a perforated area; the perforated area is formed by interweaving longitudinal screen strips and transverse screen strips; side parts of the longitudinal screen strips and the transverse screen strips and the frame are connected into a whole; the longitudinal screen strips are protruded on the screening area, and middle parts are wave-shaped protrusions and are wave-shaped in a direction of material flow; cross sections of the longitudinal screen strips are large in upper parts and small in lower parts, and the lower parts are trapezoids or arcs; a conical screen gap consistent with the direction of material flow is formed between adjacent two of the longitudinal screen strips; the transverse screen strips are slightly lower than the longitudinal screen strips, and sink in a lower part of the perforated area below the screening area; a spacing is about 12 mm; the longitudinal screen strips are connected together from the lower parts to divide the conical screen gap into a plurality of rectangular screen holes; a wavelength of the screening area is 100 to 150 mm and a vibration amplitude is 10 to 50 mm; clamping grooves are formed in one pair of opposite sides and are in buckle fit on mounting rail seats of a small beam of a screening machine; an other pair of opposite sides are planes.

\* \* \* \* \*